United States Patent
Pickett

(10) Patent No.: US 11,448,114 B2
(45) Date of Patent: Sep. 20, 2022

(54) EXHAUST TRACT FOR A COMBUSTION ENGINE

(71) Applicant: Dr. Ing. h.c. F. Porsche Aktiengesellschaft, Stuttgart (DE)

(72) Inventor: Jonathan Pickett, Leonberg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 11 days.

(21) Appl. No.: 17/374,256

(22) Filed: Jul. 13, 2021

(65) Prior Publication Data

US 2022/0018275 A1 Jan. 20, 2022

(30) Foreign Application Priority Data

Jul. 20, 2020 (DE) .................... 10 2020 119 057.3

(51) Int. Cl.
| | |
|---|---|
| *F01N 13/10* | (2010.01) |
| *F01N 3/20* | (2006.01) |
| *F01N 3/28* | (2006.01) |
| *F02D 9/04* | (2006.01) |

(52) U.S. Cl.
CPC ........... *F01N 13/10* (2013.01); *F01N 3/2013* (2013.01); *F01N 3/28* (2013.01); *F02D 9/04* (2013.01)

(58) Field of Classification Search
CPC ............ F01N 2900/1402; F01N 3/027; F01N 2240/16; F01N 3/2013; F01N 9/002; F01N 2900/1606; F01N 2900/1602; F01N 3/035; F01N 3/023
See application file for complete search history.

(56) References Cited

U.S. PATENT DOCUMENTS

| | | | | |
|---|---|---|---|---|
| 4,449,362 A | * | 5/1984 | Frankenberg | ......... F01N 3/0253 422/178 |
| 5,014,511 A | * | 5/1991 | Wade | .................... F02D 41/029 60/303 |

(Continued)

FOREIGN PATENT DOCUMENTS

| | | |
|---|---|---|
| DE | 102014115923 A1 | 5/2016 |
| DE | 102014223491 A1 | 5/2016 |

(Continued)

OTHER PUBLICATIONS

Great Britain Combined Search and Examination Report for Great Britain Application No. GB2110064.9, dated Jan. 6, 2022, 3 pages.

*Primary Examiner* — Anthony Ayala Delgado
(74) *Attorney, Agent, or Firm* — RatnerPrestia

(57) ABSTRACT

An exhaust tract for an internal combustion engine. The exhaust tract has a pipe which is connected for through flow to an exhaust manifold of the internal combustion engine. The exhaust line includes, downstream of the exhaust manifold, a purification unit for reducing pollutant emissions of the internal combustion engine. The purification unit includes at least one catalytic converter, an electrically heatable heating catalytic converter and a supporting catalytic converter supporting the heating catalytic converter. The heating catalytic converter and the supporting catalytic converter are of annular design. The heating catalytic converter is designed for a 48 volt power supply in order to reduce single-cylinder lambda effects.

8 Claims, 1 Drawing Sheet

(56) References Cited

U.S. PATENT DOCUMENTS

| | | | | |
|---|---|---|---|---|
| 6,065,957 | A * | 5/2000 | Kondo | F23C 9/00 |
| | | | | 431/116 |
| 6,397,586 | B1 * | 6/2002 | Sakurai | B01D 53/9495 |
| | | | | 60/285 |
| 6,401,451 | B1 * | 6/2002 | Yasui | F01N 13/0093 |
| | | | | 60/277 |
| 7,444,803 | B2 * | 11/2008 | Iwamoto | F01N 3/0814 |
| | | | | 60/274 |
| 7,987,935 | B2 * | 8/2011 | Ichimoto | F01N 3/0097 |
| | | | | 180/65.28 |
| 8,327,622 | B2 * | 12/2012 | Sano | B01D 53/9481 |
| | | | | 60/286 |
| 9,140,155 | B2 * | 9/2015 | Trumper | F01N 13/0097 |
| 9,555,346 | B2 * | 1/2017 | Holm | B01D 29/073 |
| 9,771,845 | B2 * | 9/2017 | Gonze | F01N 3/0878 |
| 10,443,467 | B2 | 10/2019 | Hirth et al. | |
| 10,914,212 | B1 | 2/2021 | Bargman et al. | |
| 10,995,645 | B2 | 5/2021 | Paukner et al. | |
| 2004/0067177 | A1 * | 4/2004 | Thieman | F01N 3/0878 |
| | | | | 422/177 |
| 2005/0220679 | A1 * | 10/2005 | Choi | F01N 13/009 |
| | | | | 422/177 |
| 2006/0242947 | A1 * | 11/2006 | Kay | B01D 53/945 |
| | | | | 60/284 |
| 2012/0036850 | A1 * | 2/2012 | Ernst | F01K 23/02 |
| | | | | 60/615 |
| 2012/0324868 | A1 * | 12/2012 | Kim | F01N 3/2013 |
| | | | | 60/274 |
| 2013/0061576 | A1 | 3/2013 | Gonze et al. | |
| 2013/0136675 | A1 * | 5/2013 | Eigenberger | F01N 3/2006 |
| | | | | 423/212 |
| 2018/0371973 | A1 * | 12/2018 | Holz | F01N 3/2892 |
| 2019/0032533 | A1 * | 1/2019 | Solbrig | B01J 23/60 |

FOREIGN PATENT DOCUMENTS

| | | |
|---|---|---|
| DE | 102017111125 A1 | 11/2018 |
| EP | 3581771 A1 | 12/2019 |

* cited by examiner

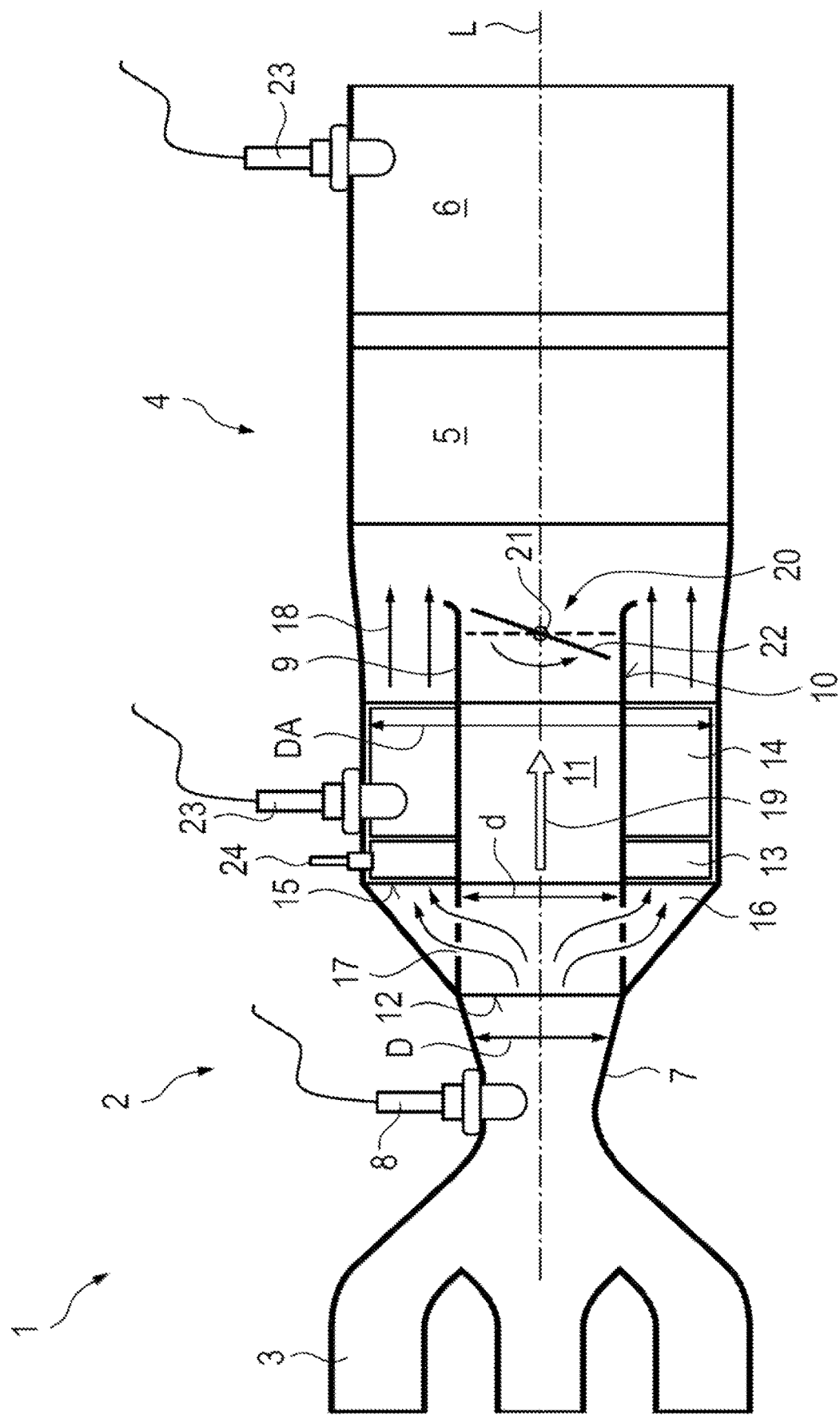

EXHAUST TRACT FOR A COMBUSTION ENGINE

CROSS-REFERENCE TO RELATED APPLICATION

This application claims priority to German Patent Application No. 10 2020 119 057.3, filed Jul. 20, 2020, the content of such application being incorporated by reference herein in its entirety.

FIELD OF THE INVENTION

The invention relates to an exhaust tract for an internal combustion engine.

BACKGROUND OF THE INVENTION

Internal combustion engines with and without an exhaust turbocharger are known. In order to reduce emissions from the internal combustion engine, different exhaust gas purification units, in particular a catalytic converter and a particle filter, are arranged downstream of an exhaust valve of the internal combustion engine in an exhaust tract of the internal combustion engine.

Efficient operation of the exhaust gas purification unit is dependent on a specific operating temperature thereof, which in turn is dependent on a temperature of the exhaust gas mass flow of the internal combustion engine flowing through it. In general, the higher the exhaust gas temperature, the more efficient the operation of the exhaust gas purification unit. At low exhaust gas temperatures, specific temperatures required for the operation of the exhaust gas purification unit are sometimes not reached. This applies especially to a "cold start" operation of the internal combustion engine. In order to bring about a correspondingly high exhaust gas temperature, internal engine measures are carried out, for example, such that, for example, an opening time of an exhaust valve is set relatively early or oxygen-rich mixture combustion is provided. The injection of secondary air into the exhaust gas mass flow is likewise known. A further possibility for heating the exhaust gas mass flow is the use of "thermal burners", which, in the form of an additional system, burn fuel injected in the exhaust tract with the exhaust gas mass flow flowing through them.

Also known are "heating catalytic converters", which have a heating element that is designed to extend into the exhaust gas mass flow and is electrically heated and heats itself and the exhaust gas mass flow flowing past it and/or through it.

These electrically heatable catalytic converters, which are preferably in the form of annular catalytic converters, are arranged on "supporting catalytic converters" to ensure their mechanical stability, preferably being designed to be pinned to them.

Nevertheless, "single-cylinder lambda effects" occur in spark ignition engines, and these can distort measurements of a lambda probe owing to differences in an exhaust gas concentration in the exhaust gas flow, the measurements in turn having an effect on fuel injection in the internal combustion engine and thus on its emissions.

Thus, in order to avoid the single-cylinder lambda effect, German Laid-Open Application DE 10 2017 111 125 A1, which is incorporated by reference herein, discloses an exhaust tract for an internal combustion engine which has an annular catalytic converter through which exhaust gas can flow and to which, starting from its end face, a reducing agent can be fed into its flow cross section. An electric heating element for heating the exhaust gas flowing through the catalytic converter is formed between this annular catalytic converter and a catalytic converter for selective catalytic reduction of nitrogen oxides, arranged in the exhaust tract downstream of the annular catalytic converter.

German Laid-Open Applications DE 10 2014 115 923 A1 and DE 10 2014 223 491 A1, which are incorporated by reference herein, each disclose an exhaust tract for an internal combustion engine which has heatable catalytic converters connected for power supply to a 48 V on-board electrical system of a motor vehicle having the internal combustion engine.

SUMMARY OF THE INVENTION

Described herein is an improved exhaust tract for an internal combustion engine.

An exhaust tract according to aspects of the invention for an internal combustion engine has a pipe which is connected for through flow to an exhaust manifold of the internal combustion engine. The exhaust line comprises, downstream of the exhaust manifold, a purification unit for reducing pollutant emissions of the internal combustion engine, wherein the purification unit comprises at least one catalytic converter, in particular in the form of a 3-way catalytic converter, an electrically heatable heating catalytic converter and a supporting catalytic converter supporting the heating catalytic converter. The heating catalytic converter and the supporting catalytic converter are of annular design. According to aspects of the invention, the heating catalytic converter is designed for a 48 volt power supply in order to reduce single-cylinder lambda effects.

The electrically heatable heating catalytic converter is provided for heating the exhaust gas flowing in the exhaust tract and serves, in particular, to shorten the time between a cold start of the internal combustion engine and the beginning of effective exhaust gas aftertreatment. Likewise, it is provided particularly in the low to medium part-load range of the internal combustion engine, in which an exhaust gas temperature is lower than in the full-load range, for the purpose of increasing the temperature of the exhaust gas for effective emissions reduction. The previously known "single-cylinder lambda effects" can be reduced and, in particular, eliminated by a 48 volt power supply to the heating catalytic converter.

In one embodiment of the exhaust tract according to aspects of the invention, the heating catalytic converter is connected to a 48 volt on-board electrical system of a motor vehicle having the internal combustion engine. This means, in other words, that, on account of the advantageously designed heating catalytic converter, the already existing on-board electrical system of the motor vehicle can be used to supply power to said converter without the need for an additional power supply unit.

Another advantage is the design particularly of the annular heating catalytic converter. In this way, a differentiated flow through the heating catalytic converter can preferably be brought about during operation of the internal combustion engine. Or in other words, there can be flow or additional flow through the heating catalytic converter when required. Thus, for example, controlled or uncontrolled flow through the heating catalytic converter can be implemented, depending on the operation of the internal combustion engine. In particular, if a control element for the flow through the heating catalytic converter is formed in the exhaust tract upstream of the catalytic converter, the heating catalytic converter can be flowed through or bypassed as required. For example, it is not absolutely necessary to supply the heating catalytic converter in full-load operation of the internal combustion engine since, in this operating range, the exhaust gas temperature is sufficient for efficient emissions reduction.

In order to improve the stability of the annular catalytic converters, a tube is arranged in the pipe, wherein the heating catalytic converter and the supporting catalytic converter are designed to surround the tube.

An inflow space is preferably formed between the tube and the pipe upstream of the heating catalytic converter, wherein, at its inlet opening formed upstream of the heating catalytic converter, the tube has a tube diameter which corresponds to a diameter of the pipe, wherein the tube has a transfer opening in the region of the inflow space. The advantage is to be seen in a stable design of the annular heating catalytic converter and of the annular supporting catalytic converter, while at the same time the exhaust gas which can flow into the inflow space via the throughflow opening can flow against the heating catalytic converter in an effective manner. In particular, the inflow space is such that, particularly in the low load range and in the part-load range of the internal combustion engine, the inflow to the heating catalytic converter preferably adjusts in comparison to a flow through the latter in its cavity.

A further improvement in the reduction of pollutants in the exhaust gas can be brought about with the aid of a catalytically active coating of the tube. For further improved exhaust gas purification, the purification unit has a particle filter.

BRIEF DESCRIPTION OF THE DRAWING FIGURES

The sole FIGURE shows a segment of an exhaust tract according to aspects of the invention for an internal combustion engine.

DETAILED DESCRIPTION OF THE INVENTION

Further advantages, features and details of the invention will become apparent from the following description of preferred exemplary embodiments and with reference to the drawing. The features and combinations of features mentioned above in the description and the features and combinations of features mentioned below in the description of the FIGURE and/or shown alone in the FIGURE can be used not only in the respectively specified combination but also in other combinations or in isolation without exceeding the scope of the invention.

The sole FIGURE shows a segment of an exhaust tract according to aspects of the invention for an internal combustion engine.

By way of example, an exhaust tract 1 according to aspects of the invention of an internal combustion engine 2 is designed in the manner visible in the FIGURE in a segment of the exhaust tract 1. The internal combustion engine 2 is in the form of a spark ignition engine.

The exhaust tract 1 is connected for through flow to an exhaust manifold 3 of the internal combustion engine 2, which serves for fluidic connection of a cylinder (not shown specifically) of the internal combustion engine 2 to the exhaust tract 1. Exhaust gas from the internal combustion engine 2 is conducted via the exhaust tract 1 and passed on to the environment.

Often, a turbine (not shown specifically) of an exhaust turbocharger (not shown specifically) is provided in the exhaust tract and is connected to a compressor (not shown specifically) arranged in an intake tract (not shown specifically) of the internal combustion engine 2. In the turbine, exhaust-gas enthalpy is used to drive the compressor so that the latter can draw in and compress combustion air. This aspirated and compressed combustion air is fed to the cylinder of the internal combustion engine in its intake stroke and is burned therein with the supply of fuel. If there is pressure charging of the internal combustion engine, and this does not necessarily have to be in the form of an exhaust turbocharger but can also be in the form of a mechanical compressor for example, there is the possibility of boosting the performance of the internal combustion engine as compared with that without pressure charging. If no pressure charging system is formed, uncompressed combustion air is fed via the intake stroke to the cylinder, where it is burned with the supply of fuel.

The end product of combustion is the exhaust gas, which, depending on the internal combustion engine 2, has a corresponding composition of pollutants, irrespective of whether it is in the form of a spark ignition engine or a diesel engine.

To reduce the pollutants contained in the exhaust gas from the internal combustion engine 2, a purification unit 4 is arranged in the exhaust tract 1. In addition to a flow-through particle filter 5, this purification unit 4 has a catalytic converter 5 arranged downstream of the particle filter 5 so as to allow through flow, as illustrated in the FIGURE. Likewise, a "DeNox" catalytic converter could also be formed, or the purification unit 4 could also be formed with a urea container for feeding urea into the exhaust gas for nitrogen oxide emissions reduction. Numerous possibilities for the embodiment of the purification unit 4 are conceivable.

The exhaust tract 1 has a pipe 7, through which flow can take place, each component of the purification unit 4 preferably being arranged in series in the pipe 7 in a manner which allows through flow. The pipe 7 is designed to increase in diameter D between the particle filter 5 and the exhaust manifold 3. Arranged in the pipe 7 upstream of the purification unit 4 and downstream of the exhaust manifold 3 is a "lambda probe" 8 for measuring an exhaust gas composition with respect to an air-fuel ratio, a residual oxygen content in the exhaust gas being determined.

Downstream of the lambda probe 8, the pipe 7 has a hollow cylindrical tube 9, it being possible, upstream of the particle filter 5, for the gas to flow both around its outer surface and through its cavity 11. At its inlet opening 12 formed in the direction of the exhaust is gas flow, the tube 9 has a tube diameter d which corresponds substantially to the diameter D and which is preferably constant or substantially constant in the axial direction along a longitudinal axis L of the pipe 7.

The tube 9 is a heating catalytic converter 13, which is electrically heatable and, in order to avoid "single-cylinder lambda effects", is supplied with power via a 48 volt on-board electrical system of a motor vehicle having the internal combustion engine 2 with the aid of a power connection 24, and is designed to receive a supporting catalytic converter 14 supporting the heating catalytic converter 13 on its outer surface 10, the heating catalytic converter 13 and the supporting catalytic converter 14 being of annular design in order to accommodate the tube 9. At least over an axial total length of the heating catalytic converter 13 and of the supporting catalytic converter 14, the diameter D is formed in accordance with the outside diameter DA of said converters.

Downstream of the inlet opening 12, up to an inlet area 15 of the heating catalytic converter 13, the diameter D is designed to widen, wherein an inflow space 16 is formed between the outer surface 10 and the pipe 7, the tube 9 having throughflow openings 17 in this region, via which, starting from the cavity 11, the exhaust gas can flow into the inflow space 16 and from there into the heating catalytic converter 13 and the supporting catalytic converter 14. This means, in other words, that, before flowing through the catalytic converter 5 and the particle filter 6, part 18 of the exhaust gas can flow through the heating catalytic converter 13 and the supporting catalytic converter 14 via the throughflow openings 17, and a further part 19 of the exhaust gas can as it were bypass the two catalytic converters 13, 14 via the tube 9. The further part 19 of the exhaust gas is fed untreated to the particle filter 5.

A quantity of the further part 19 of the exhaust gas can be adjusted with the aid of a control element 20. The control element 20 is arranged in the tube 9 upstream of the catalytic converter 6, preferably downstream of the supporting catalytic converter 14, and is in the form of a flap 22 rotatable about an axis of rotation 21. Depending on its position, the tube diameter d, to which, while taking into account a movement gap, a flap diameter of the flap 22 corresponds, is completely or partially exposed or blocked. When the tube diameter d is completely blocked, the exhaust gas is passed completely via the heating catalytic converter 13 and the supporting catalytic converter 14.

At low and medium loads of the internal combustion engine 2, the tube diameter d is completely to partially blocked with the aid of the flap 22, and therefore the exhaust gas flows predominantly via the two catalytic converters 13, 14. Particularly in the full-load range of the internal combustion engine 2, the tube diameter d is completely open, and exhaust gas can flow through the cavity 11.

The supporting catalytic converter 14 and the catalytic converter 6 each have a "two-step probe" 23. The two-step probe 23, which is also referred to as a "binary" lambda probe, has a probe signal which oscillates between two values and on the basis of which a fuel quantity is set.

In a further exemplary embodiment (not shown specifically), the tube 9 has a catalytic coating on its wall facing the exhaust gas, whereby a further emissions reduction is brought about.

LIST OF REFERENCE SIGNS

1 exhaust tract
2 internal combustion engine
3 exhaust manifold
4 purification unit
5 particle filter
6 catalytic converter
7 pipe
8 lambda probe
9 tube
10 outer surface
11 cavity
12 inlet opening
13 heating catalytic converter
14 supporting catalytic converter
15 inlet area
16 inflow space
17 through-flow opening
18 part of the exhaust gas
19 further part of the exhaust gas
20 control element
21 axis of rotation
22 flap
23 two-step probe
24 power connection
d tube diameter
D diameter
DA outside diameter
L longitudinal axis

What is claimed:

1. An exhaust tract for an internal combustion engine, said exhaust tract comprising:
    a pipe connected to permit the flow of exhaust to an exhaust manifold of the internal combustion engine, and
    a purification unit, disposed downstream of the exhaust manifold, for reducing pollutant emissions of the internal combustion engine, wherein the purification unit comprises (i) at least one catalytic converter, (ii) an electrically heatable heating catalytic converter disposed upstream of the catalytic converter, and (iii) a supporting catalytic converter supporting the heating catalytic converter,
    wherein the heating catalytic converter and the supporting catalytic converter are of annular design, and
    wherein the heating catalytic converter is configured for a 48 volt power supply in order to reduce single-cylinder lambda effects.

2. The exhaust tract as claimed in claim 1, wherein the heating catalytic converter is connected to a 48 volt on-board electrical system of the motor vehicle.

3. The exhaust tract as claimed in claim 1, further comprising a control element for controlling the flow through the heating catalytic converter is disposed in the exhaust tract at a location upstream of the catalytic converter.

4. The exhaust tract as claimed in claim 1, wherein the purification unit has a particle filter.

5. An exhaust tract for an internal combustion engine, said exhaust tract comprising:
    a pipe connected to permit the flow of exhaust to an exhaust manifold of the internal combustion engine,
    a purification unit, disposed downstream of the exhaust manifold, for reducing pollutant emissions of the internal combustion engine, wherein the purification unit comprises (i) at least one catalytic converter, (ii) an electrically heatable heating catalytic converter, and (iii) a supporting catalytic converter supporting the heating catalytic converter, and
    a control element for controlling the flow through the heating catalytic converter is disposed in the exhaust tract at a location upstream of the catalytic converter,
    wherein the heating catalytic converter and the supporting catalytic converter are of annular design,
    wherein the heating catalytic converter is configured for a 48 volt power supply in order to reduce single-cylinder lambda effects, and
    wherein the control element is arranged in the pipe at a location upstream of the catalytic converter and downstream of the heating catalytic converter.

6. An exhaust tract for an internal combustion engine, said exhaust tract comprising:
    a pipe connected to permit the flow of exhaust to an exhaust manifold of the internal combustion engine,
    a purification unit, disposed downstream of the exhaust manifold, for reducing pollutant emissions of the internal combustion engine, wherein the purification unit comprises (i) at least one catalytic converter, (ii) an electrically heatable heating catalytic converter, and (iii) a supporting catalytic converter supporting the heating catalytic converter, and wherein the heating catalytic converter and the supporting catalytic converter are of annular design, wherein the heating catalytic converter is configured for a 48 volt power supply in order to reduce single-cylinder lambda effect, and wherein the heating catalytic converter and the supporting catalytic converter are configured to surround a tube arranged in the pipe.

7. The exhaust tract as claimed in claim 6, wherein an inflow space is formed between the tube and the pipe upstream of the heating catalytic converter, wherein, at an inlet opening of the tube that is formed upstream of the heating catalytic converter, the tube has a tube diameter (d) which corresponds to a diameter (D) of the pipe, wherein the tube has a transfer opening in a region of the inflow space.

8. The exhaust tract as claimed in claim 6, wherein the tube is catalytically coated.

* * * * *